(12) United States Patent
Duttweiler et al.

(10) Patent No.: US 6,509,431 B1
(45) Date of Patent: Jan. 21, 2003

(54) TERPOLYMERS

(75) Inventors: Robert Phillip Duttweiler, Beaumont, TX (US); Michael Joseph Krause, Prairieville, LA (US); Frederick Yip-Kwai Lo, Edison, NJ (US); Shih-May Christine Ong, Warren, NJ (US); Pradeep Pandurang Shirodkar, Houston, TX (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/484,150

(22) Filed: Jan. 18, 2000

(51) Int. Cl.⁷ ............................................. C08F 236/20
(52) U.S. Cl. ...................... 526/336; 526/129; 526/130; 526/160; 526/335
(58) Field of Search ................................ 526/336, 160, 526/170, 129, 130, 335

(56) References Cited

U.S. PATENT DOCUMENTS

| | | | |
|---|---|---|---|
| 3,984,610 A | * 10/1976 | Elston | 526/336 X |
| 5,241,031 A | 8/1993 | Mehta | 526/348.1 |
| 5,272,236 A | * 12/1993 | Lai et al. | 526/160 X |
| 5,502,127 A | 3/1996 | Bai | 526/143 |
| 5,670,595 A | * 9/1997 | Meka et al. | 526/336 |
| 5,814,714 A | 9/1998 | Palomo et al. | 526/336 |
| 6,300,451 B1 | * 10/2001 | Mehta et al. | 526/339 |

FOREIGN PATENT DOCUMENTS

| | | | |
|---|---|---|---|
| EP | 0406912 | 1/1991 | C08F/10/00 |
| WO | WO9612744 | 5/1996 | C08F/210/18 |

OTHER PUBLICATIONS

ASTM D1505–98.

ASTM D1238–99.

* cited by examiner

*Primary Examiner*—Fred Teskin
(74) *Attorney, Agent, or Firm*—Stephen D. Prodnuk; Mandi B. Milbank

(57) ABSTRACT

The invention relates to alteration of a linear low density polyethylene which is ordinarily free of long chain branching to introduce long chain branching into the polymer.

3 Claims, No Drawings

TERPOLYMERS

FIELD OF THE INVENTION

The invention relates to terpolymers of ethylene, an alpha olefin of 3 to 10 carbon atoms, preferably 4 to 10 carbon atoms, and a diene which contains 7 to 10 carbon atoms. The presence of the diene coincides with long chain branching in the terpolymer; the copolymer free of the diene exhibits no long chain branching. Long chain branching is desirable as it increases the processability of the resulting polymerization product.

SUMMARY OF THE INVENTION

This invention discloses that in a linear copolymer comprising ethylene and an amount of an alpha olefin, which is free of long chain branching, exhibiting a numerical value of MFR ($I_{21}/I_2$, measured according to ASTM D-1238) of 16 to 20 and $M_w/M_n$ value of 2.0 to 3.5, the modification comprises a terpolymer containing an amount of alpha olefin, ethylene and units of a diene containing 7 to 10 carbon atoms, wherein the diene is present in an amount effective to increase the numerical value of MFR. The terpolymer exhibits $M_w/M_n$ which is substantially identical to that of the corresponding linear copolymer without diene. The diene is selected from the group consisting of 1,7-octadiene, 1,8-nonadiene and admixtures thereof.

Terpolymers of ethylene, an alpha olefin, and a diene have been produced using a supported activated metallocene catalyst. Use of the metallocene catalyst led to high comonomer incorporation of the substituted olefins. Very small amounts of diene cause a substantial change in resin MFR [$I_{21}/I_2$, measured according to ASTM D-1238, Conditions E and F] without a significant change in Mw/Mn [compared to the counterpart resin free of any diene]. This change in resin MFR with substantially constant Mw/Mn is indicative of the introduction of long chain branching into the resin.

DETAILED DESCRIPTION OF THE INVENTION

The invention relates to terpolymers which contain ethylene units, units of an alpha olefin and as the third component a diene containing 7 to 10, preferably 7 to 9, carbon atoms. These terpolymers contain at least 80, usually at least 90, wt. % of ethylene units. The terpolymers contain up to 20 wt. % of alpha mono-olefin of 3 to 10 carbon atoms and 0.1 to 20 wt. % of diene of 7 to 10 carbon atoms.

Monomers

The monomers used in addition to ethylene comprise $C_3$–$C_{10}$ alpha-olefins. Preferably, the products contain at least 80 wt. % ethylene units. The alpha olefins, alpha-monolefins, used with the ethylene in the present invention preferably contain 3 to 8 carbon atoms. Suitable alpha olefins include propylene, butene-1, pentene-1, hexene-1, 4-methylpentene-1, heptene-1, octene-1 and admixtures thereof. Preferably, the alpha-olefin comonomer comprise 1-butene, 1-hexene, 1-octene and admixtures thereof. The most preferred alpha olefin is hexene-1. Particular examples of combinations of the ethylene and alpha olefin include ethylene/1-butene, ethylene/1-hexene, ethylene/4-methyl-1-pentene, ethylene/1-butene/1-hexene, ethylene/propylene/1-hexene and ethylene/propylene/1-butene. Hydrogen may be used as a chain transfer agent in the polymerization reaction of the present invention. Any gas inert to the catalyst and reactants can also be present in the gas stream.

The diene preferably contains 6 to 10 carbon atoms, preferably 7 to 9 carbon atoms. Examples of the diene include 1,6-heptadiene; 1,7-octadiene; 1,8-nonadiene, 1,5-hexadiene and 1,9-decadiene were also used in the invention, but with lesser effect, than dienes of 7 to 9 carbon atoms on the change in MFR.

These products are prepared in the presence of a catalyst, described below, preferably under either slurry or more preferably under fluid bed gas phase catalytic polymerization conditions described below.

The products contain 0.1 to 2 ppm of transition metal, e.g., zirconium. The products also contain 5 to 100 ppm, preferably 10–50 ppm, of aluminum. Transition metal, e.g., zirconium and aluminum content of the products, is attributable to catalyst residues. The catalysts used to make the products of the invention are metallocenes of zirconium activated by aluminoxane.

The products are characterized by a density as low as 0.88 and up to less than 0.965 and preferably less than 0.94 g/cc. For applications herein, the density is greater than about 0.88, generally greater than 0.900 up to less than 0.965, preferably ranging from about 0.90 to 0.93 g/cm³.

The products of the invention exhibit a MI which can range up to 150 and up to 300 e.g., ranging from 0.01 to 300.

The low density products of the invention exhibit a melt flow ratio (MFR) which is at least 16, preferably from 16 to 60, and most preferably from 16 to 45. MFR is the ratio $I_{21}/I_2$ [wherein $I_{21}$ is measured at 190° C. in accordance with ASTM D-1238, Condition F and $I_2$ is measured at 190° C. in accordance with ASTM D-1238, Condition E].

The $M_w/M_n$ of these products ranges from about 2.0 to about 3.5. $M_w$ is the weight average molecular weight and $M_n$ is the number average molecular weight, each of which is calculated from molecular weight distribution measured by GPC (gel permeation chromatography). Products have been produced with $M_w/M_n$ lower than 2.5, in the range of 2.0 to 3.5, preferably in the range of 2 to 3.

The Catalyst

The catalyst compositions employed to produce resins of the present invention contain one transition metal provided as a metallocene. The catalysts comprise a carrier, an activator of cocatalysts and at least one metallocene.

The carrier material is a solid, particulate, porous, inorganic or organic materials, but preferably inorganic material, such as an oxide of silicon and/or of aluminum. The carrier material is used in the form of a dry powder having an average particle size of from about 1 micron to about 250 microns, preferably from about 10 microns to about 150 microns. If necessary, the treated carrier material may be sieved to insure that the particles have an average particle size of preferably less than 150 microns. This is highly desirable in forming narrow molecular weight LLDPE, to reduce gels. The surface area of the carrier is at least about 3 square meters per gram (m²/gm), and preferably at least about 50 m²/gm up to about 350 m²/gm. When the carrier is silica, it is heated to preferably about 100° C. to about 850° C. and most preferably at about 250° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 250° C. for about 4 hours to achieve a surface hydroxyl group concentration of about 1.8 millimoles per gram (mmols/gm). The silica of the most preferred embodiment is a high surface area, amorphous silica (surface area=300 m²/gm; pore volume of 1.65 cm³/gm), and it is a material marketed under the trade names of Davison 952–1836, Davison 952 or Davison 955 by the Davison Chemical Division of W. R. Grace and Company.

To form the catalysts, all catalyst precursor components can be dissolved with an activator or cocatalyst such as aluminoxane and reacted with a carrier. The carrier material is reacted with an aluminoxane solution, preferably methylaluminoxane, in a process described below. The class of aluminoxanes comprises oligomeric linear and/or cyclic alkylaluminoxanes represented by the formula:

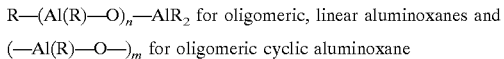

wherein n is 1–40, preferably 10–20, m is 3–40, preferably 3–20 and R is a $C_1$–$C_8$ alkyl group and preferably methyl. Methylaluminoxane (MAO) is a mixture of oligomers with a very wide distribution of molecular weights and usually with an average molecular weight of about 1000. MAO is typically kept in solution in toluene.

In one preferred embodiment of aluminoxane, incorporation into the carrier depends on the pore volume of the silica. In this embodiment, the process of impregnating the carrier material is by infusion of the aluminoxane solution, without forming a slurry of the carrier material, such as silica, in the aluminoxane solution. The volume of the solution of the aluminoxane is sufficient to fill the pores of the carrier material without forming a slurry in which the volume of the solution exceeds the pore volume of the silica; accordingly and preferably, the maximum volume of the aluminoxane solution is and does not exceed the total pore volume of the carrier material sample. [It has been discovered that up to 30% excess of solvent volume based on the silica pores can be used without producing a silica slurry during impregnation.] That maximum volume of the aluminoxane solution insures that no slurry of silica is formed. Accordingly, if the pore volume of the carrier material is 1.65 $cm^3$/g, then the volume of aluminoxane will be equal to or less than 1.65 $cm^3$/gram of carrier material. As a result of this proviso, the impregnated carrier material will appear dry immediately following impregnation although the pores of the carrier will be filled with inter alia solvent.

Solvent may be removed from the aluminoxane impregnated pores of the carrier material by heating and/or under a positive pressure induced by an inert gas, such as nitrogen. If employed, the conditions in this step are controlled to reduce, if not to eliminate, agglomeration of impregnated carrier particles and/or cross-linking of the aluminoxane. In this step, solvent can be removed by evaporation effected at relatively low elevated temperatures of above about 40° C. and below about 50° C. Although solvent can be removed by evaporation at relatively higher temperatures than that defined by the range above 40° C. and below about 50° C., very short heating times schedules must be employed.

In a preferred embodiment, the metallocene is added to the solution of the aluminoxane prior to reacting the carrier with the solution. The maximum volume of the aluminoxane solution also including the metallocene can be the total pore volume of the carrier material sample. The mole ratio of aluminoxane provided aluminum, expressed as Al, to metallocene metal expressed as M (e.g. Zr), ranges from 50 to 500, preferably 75 to 300, and most preferably 100 to 200. An added advantage of the present invention is that the Al:Zr ratio can be directly controlled. In a further preferred embodiment, the aluminoxane and metallocene compound are mixed together at a temperature of about 20° C. to 80° C., for 0.1 to 6.0 hours, prior to reaction with the carrier. The solvent for the metallocene and aluminoxane can be appropriate solvents, such as aromatic hydrocarbons, halogenated hydrocarbon or halogenated aromatic hydrocarbons, preferably toluene.

In an alternative synthesis of the catalyst, the volume of solution of alumoxane contacted carrier can be dispersed in a second solvent. A critical aspect of the alternative impregnation process is the use of a second liquid medium in addition to the alumoxane solution. The liquid medium is a hydrocarbon which contains 5 to 20 carbon atoms. Illustrative compounds which can be used as the liquid medium include pentane, isopentane, hexane, isohexane, heptane, octane, nonane, decane, dodecane, cyclopentane, cyclohexane, and cycloheptane or mixture thereof. Isomers of these hydrocarbons could also be used. The volume of the second liquid medium in the alternative synthesis is also critical in that this volume must be sufficient to form a slurry. In general, this volume should be 2 to 15 times the pore volume of the support as measured by nitrogen adsorption method (BET method). For example, for a silica support with 1.5 cc/g pore volume, a minimum of 3 cc of the second medium, e.g. hexane, and a maximum of 20 cc/g silica would be employed.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a poly-substituted cyclopentadienyl group. The substituents on the cyclopentadienyl group can be preferably straight-chain or branched $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen, —$Si(CH_3)_2$—, $Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl or aromatic groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis (cyclopentadienyl)metal dihalides, bis(cyclopentadienyl) metal hydridohalides, bis(cyclopentadienyl)metal monoalkyl monohalides, bis(cyclopentadienyl)metal dialkyls and bis(indenyl)metal dihalides wherein the metal is titanium, zirconium or hafnium, halide groups are preferably chlorine and the alkyl groups are $C_1$–$C_6$ alkyls. Illustrative, but non-limiting, examples of metallocenes include bis (cyclopentadienyl)zirconium dichloride, bis (cyclopentadienyl)hafnium dichloride, bis (cyclopentadienyl)zirconium dimethyl, bis (cyclopentadienyl)hafnium dimethyl, bis(cyclopentadienyl) zirconium hydridochloride, bis(cyclopentadienyl)hafnium hydridochloride, bis(pentamethylcyclopentadienyl) zirconium dichloride, bis(pentamethylcyclopentadienyl) hafnium dichloride, bis(n-butylcyclopentadienyl)-zirconium dichloride, bis(iso-butylcyclopentadienyl) zirconium dichloride, bis(dimethylcyclopentadienyl) zirconium dichloride, cyclopentadienyl-zirconium trichloride, bis (indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

The catalyst comprising a metallocene compound and an aluminoxane in particulate form is fed to the fluid bed reactor for gas phase polymerizations and copolymerizations of ethylene and higher alpha olefins.

The Process Conditions

When polymerization is undertaken in the gas phase, fluidized bed, it is essential to operate the fluid bed reactor at a temperature below the sintering temperature of the polymer particles. To insure that sintering will not occur, operating temperatures below the sintering temperature are desired. For the production of ethylene polymers in the process of the present invention an operating temperature for olefin polymerization of about 60° C. to 115° C. is preferred, and a temperature of about 75° C. to 95° C. is most preferred.

The reactor is operated at pressures of about 100 to 350 psi.

In fluidized bed reactors, the superficial gas velocity of the gaseous reaction mixture through the bed must exceed the minimum flow required for fluidization, and preferably is at least 0.2 feet per second above the minimum flow. A "diluent" gas is employed with the comonomers; it is nonreactive under the conditions in the polymerization reactor. The diluent gas can be nitrogen, argon, helium, methane, ethane, and the like. Ordinarily the superficial gas velocity does not exceed 5.0 feet per second, and most usually no more than 2.5 feet per second is sufficient. The feed stream of gaseous monomer, with or without inert gaseous diluents, is fed into the reactor at a space time yield of about 2 to 10 pounds/hour/cubic foot of bed volume.

The copolymer product produced in the presence of the preferred catalysts, described above, in a gas phase fluid bed process.

For film production, the products may contain any of various additives conventionally added to polymer compositions such as lubricants, microtaic, stabilizer, antioxidants, compatibilizers, pigments, etc. These reagents can be employed to stabilize the products against oxidation. The products of the invention can be blended with another linear polymer or copolymer of ethylene having a density of 0.910 to 0.97 g/cc.; for example, the other linear polymer or copolymer can be one produced by a free radical polymerization, at pressures which exceed 350 psi. The polymers can be added directly to a blown film extruder, e.g., a Sterling extruder, to produce films having a thickness, for example of about 0.5 to 5 mils.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| Density | ASTM D-1505 - A plaque is made and conditioned for one hour at 100° C. to approach equilibrium crystallinity. Measurement for density is then made in a density gradient column; reported as gms/cc. |
|---|---|
| Melt Index (MI), $I_2$ | ASTM D-1238 - Condition E<br>Measured at 190 C. - reported as grams per 10 minutes. |
| High Load HLMI), $I_{21}$ | ASTM D-1238 - Condition F<br>Measured at 10.5 times the weight used in the melt index test above. |
| Melt Flow Ratio (MFR) | $= \dfrac{I_{21}}{I_2}$ |

All procedures were performed under a dry nitrogen atmosphere. All liquids/solvents were anhydrous. $^{13}C$ NMR spectra were recorded on a JEOL Eclipse 400 at 100.4 MHz under quantitative conditions. A $(BuCp)_2ZrCl_2$ and methylaluminoxane (MAO) supported on silica catalyst were used for the polymerizations.

Ethylene/1-hexeneldiene terpolymers were prepared by the polymerization procedure described below. 1-hexene and diene concentrations were varied as described. Ethylene/diene copolymers were prepared identically, but without 1-hexene.

A 1 gallon stainless steel autoclave at room temperature was charged with 1500 mL heptane, 150 mL 1-hexene, 10 mL 1,7-octadiene, and 1.0 mL of 14 wt. % tri-isobutylaluminum in hexane. The reactor was closed, and the temperature was brought to 70° C. 26.6 mg of catalyst was introduced with ethylene pressure. Ethylene was replenished on demand to keep reactor pressure constant at 130 psi. After 60 minutes, the reactor was vented and cooled to room temperature. 37 grams of polymer were collected. The polymer was dried in a vacuum oven to remove residual volatile hydrocarbons, melt homogenized on a roll mill at 160° C., and stabilized with antioxidant.

Terpolymers of ethylene, hexene, and long chain dienes were produced using a supported metallocene/MAO catalyst described in the catalyst. Very small amounts of diene, particularly 1,7-octadiene, cause a substantial change in resin MFR without a significant change in $M_w/M_n$. This increase in MFR is indicative of presence of long chain branching as described in U.S. Pat. No. 5,272,236 which is incorporated herein by reference.

1,5-hexadiene, 1,7-octadiene, 1,9-decadiene, and 1-decene were terpolymerized with hexene and ethylene under identical slurry conditions and are thus the termonomer referred to in Table 1.

TABLE 1

| Termonomer | None | 1,5-$C_6$ | 1,7-$C_8$ | 1,9-$C_{10}$ | $C_{10}$ |
|---|---|---|---|---|---|
| g/g/hr/ 100 psi Productivity | 1900 | 1800 | 1200 | 2300 | 2400 |
| MI | 0.36 | 0.59 | 0.37 | 1.0 | 0.46 |
| MFR | 16.9 | 21.2 | 34.1 | 25.9 | 18.7 |
| density (g/mL) | 0.908 | 0.910 | 0.913 | 0.909 | 0.909 |
| Mw/Mn | 2.55 | 2.44 | 3.01 | 3.44 | 2.51 |
| mole % $C_6$ | 3.1 | 3.3 | 3.3 | 3.8 | 3.1 |
| $T_m$ (C.) | 100 | 100, 110 | 102, 118 | 101 | 100, 113 |

(5.0 mL termonomer were used in each case. 1,5-$C_6$ is 1,5-hexadiene. 1,7-$C_8$ is 1,7-octadiene. 1,9-$C_{10}$ 1,9-decadiene. $C_{10}$ is 1-decene.)

Small amounts of 1,7-octadiene or 1,9-decadiene raised resin MFR from 17 to between 25 and 35, without significantly effecting MI, density, % $C_6$, melting point, or $M_w/M_n$. Terpolymerization of ethylene, hexene, and low levels of decene produced polymer that was not significantly different from ethylene and hexene copolymers. The 1,5-hexadiene terpolymers were little changed from the ethylene/1-hexene copolymer control.

The copolymer of ethylene and an alpha mono-olefin of 3 to 10 carbon atoms exhibit an MFR numerical value in the range of 16 to 20.

Copolymers of ethylene and the dienes were produced as shown in Table 2. The 1,7-octadiene copolymer showed the highest MFR of any of these diene polymers.

TABLE 2

| Termonomer | 1,5-$C_6$ | 1,7-$C_8$ | 1,9-$C_{10}$ | $C_{10}$ |
|---|---|---|---|---|
| Comononer Productivity g/g/hr/100 psi | 560 | 710 | 800 | 850 |
| MI | 0.11 | 0.24 | 0.61 | 0.93 |
| MFR | 23.4 | 43.2 | 26.1 | 19.3 |
| $M_w/M_n$ | 2.37 | 2.72 | 2.59 | 2.41 |

The copolymers were analyzed by $^{13}$C NMR. The decene/ethylene product was confirmed to be a simple LLDPE copolymer with no unusual structural features. NMR confirmed that the hexadiene cyclizes in the 1,5-hexadiene/ethylene copolymers to produce a product similar to a cyclopentene/ethylene copolymer as shown:

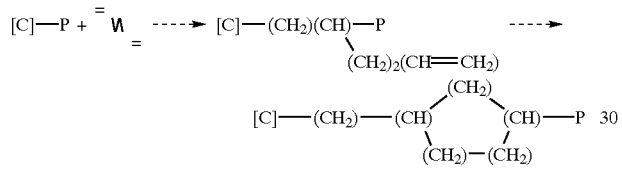

The NMR of the 1,7-octadiene and 1,9-decadiene products show more than one branched species is present in each of these copolymers. Preliminary analysis indicates, however, that the level of branching in the 1,7-octadiene copolymer is at least 10 times that in the 1,9-decadiene copolymer. This observation is consistent with the MFR data.

Octadiene concentration was varied in polymerization experiments as shown in Table 3. MFR increased at higher diene levels.

TABLE 3

| Octadiene amount (mL) | 0.5 | 5.0 | 10.0 | 20.0 |
|---|---|---|---|---|
| Productivity g/_g/hr/100 psi | 2000 | 1200 | 1100 | 1200 |
| $C_6$ (mL) | 125 | 150 | 150 | 150 |
| $I_2$ | 1.21 | 0.67 | 0.98 | 0.59 |
| MFR | 21.9 | 33.9 | 29.5 | 37.7 |

TABLE 3-continued

| Octadiene amount (mL) | 0.5 | 5.0 | 10.0 | 20.0 |
|---|---|---|---|---|
| $M_w/M_n$ | 2.19 | 2.70 | 2.67 | 2.45 |
| density (g/mL) | 0.918 | 0.918 | 0.920 | 0.920 |
| % $C_6$ | 2.4 | 2.6 | 2.65 | 2.56 |
| $T_m$ (C.) | 107, 121 | 106, 120 | 106, 123 | 108, 121 |

What is claimed is:

1. A terpolymer comprising ethylene, an alpha olefin, and a diene containing 7 to 10 carbon atoms, said terpolymer having an $M_w/M_n$ of 2.0 to 3.5 and having an amount of diene effective to cause an increase in numerical MFR value ($I_{21}/I_2$, measured according to ASTM D-1238) compared to corresponding linear copolymer without diene, said copolymer having an MFR value of 16 to 20 and $M_w/M_n$ value of 2.0 to 3.5, wherein the terpolymer has an MFR value of between 25 and 35.

2. A terpolymer comprising ethylene, an alpha olefin, and a diene containing 7 to 10 carbon atoms, said terpolymer having an amount of diene effective to cause an increase in numerical MFR value ($I_{21}/I_2$, measured according to ASTM D-1238) compared to corresponding linear copolymer without diene, said copolymer having an MFR value of 16 to 20 and $M_w/M_n$ value of 2.0 to 3.5, wherein said terpolymer exhibits $M_w/M_n$ which is substantially identical to that of the corresponding linear copolymer without diene, and wherein the terpolymer has an MFR value of between 25 and 35.

3. A process of introducing long chain branching into a polymeric composition which is free of long chain branching and comprises ethylene and an alpha mono-olefin of 3 to 10 carbon atoms, and exhibiting a numerical value of MFR ($I_{21}/I_2$, measured according to ASTM D-1238) in the range of 16 to 20 and Mw/Mn value of 2 to 3.5, comprising:

contacting ethylene and the alpha olefin in the presence of a catalyst and in the presence of a diene of 7 to 10 carbon atoms, under olefin polymerization conditions, wherein the catalyst comprises a supported activated transition metal, and wherein a source of the transition metal was provided as a metallocene;

maintaining said Mw/Mn value while increasing the numerical value of MFR, wherein the increased numerical value of MFR is between 25 and 35; and recovering product.

* * * * *